(12) United States Patent
Huffman et al.

(10) Patent No.: US 6,980,984 B1
(45) Date of Patent: Dec. 27, 2005

(54) CONTENT PROVIDER SYSTEMS AND METHODS USING STRUCTURED DATA

(75) Inventors: Scott B. Huffman, Redwood City, CA (US); David B. Kay, Los Gatos, CA (US)

(73) Assignee: Kanisa, Inc., Cupertino, CA (US)

( * ) Notice: Subject to any disclaimer, the term of this patent is extended or adjusted under 35 U.S.C. 154(b) by 493 days.

(21) Appl. No.: 10/150,885

(22) Filed: May 16, 2002

Related U.S. Application Data

(60) Provisional application No. 60/291,010, filed on May 16, 2001.

(51) Int. Cl.[7] ............................................. G06F 17/30
(52) U.S. Cl. ...................................... 707/3; 707/104.1
(58) Field of Search .............................. 707/1–5, 104.1

(56) References Cited

U.S. PATENT DOCUMENTS

| | | | |
|---|---|---|---|
| 4,366,551 A | * 12/1982 | Holtz ............................ 707/1 |
| 5,309,359 A | 5/1994 | Katz et al. ............. 364/419.19 |
| 5,404,295 A | 4/1995 | Katz et al. ............. 364/419.19 |
| 5,553,226 A | 9/1996 | Kiuchi et al. ................ 395/161 |
| 5,555,408 A | 9/1996 | Fujisawa et al. ............ 395/600 |
| 5,568,640 A | 10/1996 | Nishiyama et al. ......... 395/600 |
| 5,594,837 A | 1/1997 | Noyes .......................... 395/63 |
| 5,600,831 A | 2/1997 | Levy et al. .................. 395/602 |
| 5,625,767 A | 4/1997 | Bartell et al. ................ 395/140 |
| 5,628,009 A | 5/1997 | Kikuta et al. ................ 395/610 |
| 5,630,125 A | 5/1997 | Zellweger ................... 395/614 |
| 5,644,740 A | 7/1997 | Kiuchi ........................ 395/357 |
| 5,659,725 A | 8/1997 | Levy et al. .................. 395/600 |
| 5,715,468 A | * 2/1998 | Budzinski ....................... 704/9 |
| 5,721,910 A | * 2/1998 | Unger et al. ................ 707/100 |
| 5,787,417 A | 7/1998 | Hargrove ....................... 707/4 |
| 5,796,926 A | 8/1998 | Huffman | |
| 5,819,258 A | 10/1998 | Vaithyanathan et al. ........ 707/2 |
| 5,841,895 A | 11/1998 | Huffman | |
| 5,845,270 A | 12/1998 | Schatz et al. ................. 706/11 |
| 5,878,423 A | 3/1999 | Anderson et al. ........... 707/100 |
| 5,991,756 A | 11/1999 | Wu ............................... 707/3 |
| 6,141,651 A | 10/2000 | Riley et al. | |
| 6,169,986 B1 | 1/2001 | Bowman et al. ............... 707/5 |
| 6,233,575 B1 | 5/2001 | Agrawal et al. ............... 707/6 |

(Continued)

FOREIGN PATENT DOCUMENTS

WO    WO-97/38378    10/1997    .......... G06F 17/30

(Continued)

OTHER PUBLICATIONS

"(Kanisa) Intelligized Business Processes", (1998), 12 pgs.

(Continued)

*Primary Examiner*—Jack M. Choules
(74) *Attorney, Agent, or Firm*—Schwegman, Lundberg, Woessner & Kluth, P.A.

(57) ABSTRACT

This document discusses, among other things, systems, devices, and methods for implementing a content provider using at least one structured data attribute, with an integer, float, string, or date value or the like. One or more such structured data attributes is obtained from a user query, a user attribute, a user selection, a document or other content resource, or an instance within an interactive user-provider dialog. One or more such structured data attributes is auto-mapped to a set of ordered concepts in an at least partially ordered taxonomy of a knowledge map representing a multidimensional organization of such concepts. A structured data attribute and/or an ordered concept is used to control the dialog, constrain a user's search, or order and present search results, either alone, or in combination with nonstructured (e.g., textual) data and/or one or more concepts that is not ordered using a structured data parameter.

53 Claims, 6 Drawing Sheets

U.S. PATENT DOCUMENTS

| | | | |
|---|---|---|---|
| 6,256,627 B1 | 7/2001 | Beattie et al. | 707/6 |
| 6,282,538 B1 | 8/2001 | Woods | 707/5 |
| 6,297,824 B1 | 10/2001 | Hearst et al. | 345/357 |
| 6,301,579 B1 | 10/2001 | Becker | 707/102 |
| 6,314,420 B1 | 11/2001 | Lang et al. | 707/3 |
| 6,438,533 B1 * | 8/2002 | Spackman et al. | 706/45 |
| 6,513,027 B1 * | 1/2003 | Powers et al. | 706/47 |
| 6,711,585 B1 * | 3/2004 | Copperman et al. | 707/104.1 |

FOREIGN PATENT DOCUMENTS

| | | | | |
|---|---|---|---|---|
| WO | WO-98/49632 | 11/1998 | | G06F 17/30 |
| WO | WO-99/18526 | 4/1999 | | G06F 17/24 |

OTHER PUBLICATIONS

"About the Information Manifold", *web page*, http://portal-.research.bell-labs.com/orgs/ssr/people/levy/manifold.htm 1 Pg. 1998.

"FAQ—Connect Care by ProAmerica", (1998),3 pgs http://www.proam.com/splash/faqscon.1 1998.

"IBM Version 2—Intelligent Miner for Data", (1998),2 pgs http://www.software.ibm.com/data/iminer/fordata/brocnu.

"IBM Version 2.1—Intelligent Miner for Data", (1998),2 pgs http://www.software.ibm.com/data/iminer/fordata/brief.ht.

"IBM Data Mining Technology", (1996),25 pgs.

"Industry Solutions: Markets and Applications", (Nov. 19, 1998),3 pgs http://www.proam.com/splash/HWSWfr.htm.

"Kana Communications—Success Story: eBay", (Nov. 1998), 4 pgs.

"Kana Communications—Success Story: Netscape", 4 pgs.

"ProAmerica Connect Care—The First Customer Care Software", 12 pgs.

"ProAmerica Redefines Customer Care with Visual Warehouse", *IBM*, (Feb. 1998),2 pgs.

"Quality Connect", *Web Page*, (1998), http://www.proam.com/splash/qualitycon.h.

"Sales Connect", *Web Page*, (1998), http://www.proam.com/splash/salescon.h.

Chakrabarti, Soumen, et al., "Scalable Feature Selection, Classification and Signature Generation for Organizing Large Text Databases into Hierarchical Topic Taxonomies", *The VLDB Journal, 7*, (1998),163-178.

"Support Connect", *Web Page*, (1998), http://www.proam.com/splash/supportcon.html.

"Survey Connect", *Web Page*, (1998), http://www.proam.com/splash/surveycon.html.

"Using the Intelligent Miner in a Simple Scenario", *Version 2.1.1, IBM*, (Apr. 1998),35 pgs.

"Web Connect", *webpage*, (Nov. 1998),2 pgs http://www.proam.com/splash/webcon.h.

Buckley, James P., "A Hierarchical Clustering Strategy for Very Large Fuzzy Databases", *IEEE Int'l Conf. on Systems, Man and Cybernetics, 4*, (1995),3573-3578.

Chakrabarti, Soumen, et al., "Scalable Feature Selection, Classification and Signature Generation for Organizing Large Text Databases into Hierarchical Topic Taxonomies", *The VLDB Journal, 7*, (1998),163-178.

Li, Wen-Syan , "PowerBookmarks: A System for Personalizable Web Information Organization, Sharing, and Management", *Proc. ACM SIGMOD Int'l Conf. on Management of Data, 28*, (1999),565-567.

Magennis, Mark , "The Potential and Actual Effectiveness of Interactive Query Expansion", *Annual Int'l. ACN-SIGIR Conf. on Research and Development in Information Retrieval*, (1997),324-332.

Stodder, David , "Toward Universal Business Intelligence: An Interview with Janet Perna", (1997),6 pgs.

Tkach, Daniel S., "Information Mining with the IBM Intelligent Miner Family", *An IBM Software Solutions White Paper*, (1998),1-29.

Wong, Jacqueline W., "Action: Automatic Classification for Full-Text Documents", *Association of Computing Machinery SIGIR Forum, 30*, (1996),26-41.

Huffman, Scott.B. ,et al. , "Toward Structured Retrieval in Semi-structures Information Spaces", *In Proceedings of the 15th International Conf. on Artificial Intelligence (IJCAI-97)*, (1997).

* cited by examiner

CONTENT PROVIDER SYSTEMS AND METHODS USING STRUCTURED DATA

CROSS-REFERENCE TO RELATED APPLICATIONS

This patent application claims the benefit of priority, under 35 U.S.C. Section 119(e), to Huffman U.S. Provisional Patent Application Ser. No. 60/291,010, entitled "SYSTEM AND METHOD FOR PROVIDING STRUCTURED DATA," filed May 16, 2001.

FIELD OF THE INVENTION

This document relates generally to among other things, computer-based content provider systems, devices, and methods and particularly, but not by way of limitation, to using structured data in the same.

BACKGROUND

A computer network, such as the Internet or World Wide Web, typically serves to connect users to the information, content, or other resources that they seek. Web content, for example, varies widely both in type and subject matter. Examples of different content types include, without limitation: text documents; audio, visual, and/or multimedia data files. A particular content provider, which makes available a predetermined body of content to a plurality of users, must steer a member of its particular user population to relevant content within its body of content.

For example, in an automated customer relationship management (CRM) system, the user is typically a customer of a product or service who has a specific question about a problem or other aspect of that product or service. Based on a query or other request from the user, the CRM system must find the appropriate technical instructions or other documentation to solve the user's problem. Using an automated CRM system to help customers is typically less expensive to a business enterprise than training and providing human applications engineers and other customer service personnel. According to one estimate, human customer service interactions presently cost between $15 and $60 per customer telephone call or e-mail inquiry. Automated Web-based interactions typically cost less than one tenth as much, even when accounting for the required up-front technology investment.

One ubiquitous navigation technique used by content providers is the Web search engine. A Web search engine typically searches for user-specified text, either within a document, or within separate meta-data associated with the content. Language, however, is ambiguous. The same word in a user query can take on very different meanings in different context. Moreover, different words can be used to describe the same concept. These ambiguities inherently limit the ability of a search engine to discriminate against unwanted content. This increases the time that the user must spend in reviewing and filtering through the unwanted content returned by the search engine to reach any relevant content. As anyone who has used a search engine can relate, such manual user intervention can be very frustrating. User frustration can render the body of returned content useless even when it includes the sought-after content. When the user's inquiry is abandoned because excess irrelevant information is returned, or because insufficient relevant information is available, the content provider has failed to meet the particular user's needs. As a result, the user must resort to other techniques to get the desired content. For example, in a CRM application, the user may be forced to place a telephone call to an applications engineer or other customer service personnel. As discussed above, however, this is a more costly way to meet customer needs. To increase the effectiveness of a CRM system or other content provider, intelligence can be added to the content, such as by providing an organizational structure for the content and engaging in an interactive user-provider dialog. However, the present inventors have recognized an unmet need for improved techniques for, among other things, using the organizational structure and/or dialog for better steering the user to needed content.

SUMMARY

This document describes, among other things, providing such improved techniques using systems, devices, and methods for implementing a content provider that includes at least one structured data attribute, with an integer, float, string, or date value or the like. In one example, one or more such structured data attributes is obtained from a user query, a user attribute, a user selection, a document or other content resource, or an instance within an interactive user-provider dialog. In another example, one or more such structured data attributes is auto-mapped to a set of ordered concepts in an at least partially ordered taxonomy of a knowledge map representing a multidimensional organization of such concepts. In a further example, a structured data attribute and/or an ordered concept is used to control the dialog, constrain a user's search, or order and present search results, either alone, or in combination with nonstructured (e.g., textual) data and/or one or more concepts that is not ordered using a structured data parameter.

In a first illustrative example, the content provider system includes a multidimensional knowledge map. The knowledge map includes concepts. The concepts are organized into taxonomies. Each taxonomy includes a hierarchical structure. At least one taxonomy includes a first concept that is ordered with respect to a second concept independent of the hierarchical structure. The content provider system also includes content items. At least one of the items is tagged to at least one of the concepts using a value of a structured data attribute associated with the at least one of the items.

Further variations on this example include other features. In one example, the tagged item is selected from the group consisting of a user query, a user attribute, and a resource. In another example, the item is tagged to at least one of the concepts using at least one keyword included in the item. In another example, the first concept includes a first mapping function including an input and an output. The input of the first mapping function includes a value of a structured data attribute of at least one item. The output of the first mapping function indicates whether to tag the item to the first concept. In a further example, the second concept includes a second mapping function. The second mapping function includes an input and an output. The input of the second mapping function includes a value of a structured data attribute of at least one item. Te output of the mapping function indicates whether to tag the at least one item to the second concept, such that the at least one item tagged to the first concept is ordered with respect to the at least one item tagged to the second concept. In one example, the input of the first mapping function includes information obtained from a source external to the system that is used in providing the output of the first mapping function. In another example, the input of the first mapping function uses information about how the at least one item tags to other concepts in providing the output of the first mapping function. In a further example, the input of the first mapping function uses information about at least one keyword included in the at least one item in providing the output of the first mapping function.

In a second illustrative example, the content provider system includes a multidimensional knowledge map. The knowledge map includes concepts organized into taxonomies. Each taxonomy includes a hierarchical structure. At least one taxonomy a first concept that is ordered with respect to a second concept independent of the hierarchical structure. The system also includes a first constraint to items associated with only one of the first and second concepts, in which the first constraint is based on at least one value of the structured data parameter, to be specified by or associated with a particular user, that maps to at least one value of the structured data parameter associated with the only one of the first and second concepts.

Further variations on this example include an embodiment in which the first constraint is based on at least one structured data ordered operator to be specified by or associated with a particular user. In another example, the structured data ordered operator is selected from the group consisting of: "less than," "left of," "greater than," "right of," and "between." Another example includes a second constraint to at least one portion of the knowledge map based on language to be specified by or associated with the particular user. In one example, the second constraint is based on at least one hierarchical ordered operator. In one example, the hierarchical ordered operator is selected from the group consisting of: "under," "is part of," "at." and "above."

In a third illustrative example, this document describes a method of providing content to a user. The method includes organizing concepts into groups representing dimensions of a domain, including ordering a first concept with respect to a second concept in the same group, using at least one structured data parameter, tagging at least one item to at least one of the first and second concepts, and constraining a user's search to only one of the first and second concepts.

Variations on this example include constraining based at least in part on at least one value of the structured data parameter, to be specified by or associated with a particular user, that maps to at least one value of the structured data parameter associated with the only one of the first and second concepts. In another example, the constraining is based at least in part on at least one structured data ordered operator to be specified by or associated with a particular user. In another example, the constraining is based on language to be specified by or associated with the particular user. In another example, the constraining is based on at least one hierarchical ordered operator. In a further example, the tagging at least one item includes tagging at least one item selected from the group consisting of a user query, a user attribute, and a resource.

A fourth illustrative example describes a content provider system. The system includes a multidimensional knowledge map. The knowledge map includes concepts organized into taxonomies. Each taxonomy includes a hierarchical structure. At least one taxonomy includes a first concept that is ordered with respect to a second concept independent of the hierarchical structure using a structured data parameter. A user interface is configured to present a question to a user to elicit from the user information about at least one value of a structured data parameter that maps to the structured data parameter used to order the first and second concepts.

In various further examples, this document describes a user interface that is configured to present multiple questions to the user to elicit from the user information about multiple values of corresponding multiple structured data parameters that map to multiple structured data parameters used to order concepts along different dimensions of the knowledge map. Another example includes constraints to portions of multiple taxonomies based on the information about multiple values of the corresponding multiple structured data parameters.

A fifth illustrative example describes a method of providing content to a user. The method includes organizing concepts into groups representing dimensions of a domain, including ordering a first concept with respect to a second concept in the same group, using at least one structured data parameter, and presenting a question to a user to elicit from the user information about at least one value of a structured data parameter that maps to the structured data parameter used to order the first and second concepts.

Further variations on this example include presenting multiple questions to the user to elicit from the user information about multiple values of corresponding multiple structured data parameters that map to multiple structured data parameters used to order concepts along different dimensions of the knowledge map. Another variation includes constraining a user's search to portions of multiple taxonomies based on the information about multiple values of the corresponding multiple structured data parameters. Another example includes tagging at least one item to at least one of the first and second concepts, and constraining a user's search to only one of the first and second concepts.

A sixth illustrative example includes a method of providing content to a user. The method includes organizing concepts into hierarchical groups representing dimensions of a domain, including ordering a first concept with respect to a second concept in the same group independent of the hierarchy using at least one structured data parameter, and presenting at least one question to a user to elicit from the user information about a range of ordered concepts that is relevant to the user's needs.

One variation upon this example includes presenting multiple questions to the user to elicit from the user information about multiple ranges of ordered concepts that are relevant to the user's needs. Another example includes receiving from the user information about the range of ordered concepts that is relevant to the user's needs, and constraining the user's search to the indicated range of ordered concepts received from the user. The range of ordered concepts may include a single ordered concept, all concepts that are ordered as being to the left of a particular ordered concept, all concepts that are ordered as being to the right of a particular ordered concept, and all concepts that are ordered as being between two specified ordered concepts.

A seventh illustrative example of a content provider system includes a multidimensional knowledge map. The knowledge map includes concepts organized along dimensions of the knowledge map into taxonomies. The concepts include items tagged thereto. The knowledge map includes a first concept that is ordered with respect to a second concept, within the same first taxonomy, using at least one structured data parameter. A dialog engine maps a user to only one of the first and second concepts based on a value of a structured data user attribute associated with the user.

One variation on this example includes a user interface, coupled to the dialog engine, in which the user interface is configured to conditionally formulate a question to be presented to the user based on which one of the first and second concepts to which the user is mapped.

An eighth illustrative example describes a method of providing content to a user. The method includes organizing concepts into groups representing dimensions of a domain, including ordering a first concept with respect to a second concept in the same group, using at least one structured data parameter, and mapping a user to only one of the first and second concepts based on a value of a structured data user attribute associated with the user. One variation on this example includes conditionally formulating a question to be presented to the user based on which one of the first and second concepts to which the user is mapped.

A ninth illustrative example describes a content provider system that includes a multidimensional knowledge map. The knowledge map includes concepts organized along dimensions of the knowledge map into taxonomies. The concepts include items tagged thereto. The knowledge map includes a first concept that is ordered with respect to a second concept, within the same first taxonomy, using at least one structured data parameter. A dialog engine is configured to provide an interactive dialog between the system and a user for constraining the user's search for needed content to at least one portion of the knowledge map. In this example, the dialog engine includes a user interface that is configured to conditionally formulate a question to be presented to the user based on a structured data user attribute associated with the user.

A tenth illustrative example describes a method of providing content to a user. The method includes organizing concepts into groups representing dimensions of a domain, including ordering a first concept with respect to a second concept in the same group, using at least one structured data parameter, and providing an interactive dialog between the system and a user for constraining the user's search for needed content to at least one portion of the knowledge map, in which the dialog engine includes a user interface that is configured to conditionally formulate a question to be presented to the user based on a structured data user attribute associated with the user.

An eleventh illustrative example describes a content provider system. The system includes a multidimensional knowledge map. The knowledge map includes concepts organized along dimensions of the knowledge map into taxonomies. The concepts include items tagged thereto. The knowledge map includes a first concept that is ordered with respect to a second concept, within the same first taxonomy, using at least one structured data parameter. A dialog engine is configured to provide an interactive dialog between the system and a user to constrain the user's search for needed content to at least one portion of the knowledge map based at least in part on information obtained from the user about at least one structured data parameter. An application interface is coupled to at least one of the dialog engine and the knowledge map. The application interface is configured to pass at least one structured data parameter to an external application.

One variation on this example further includes a user interface including a user-selectable link that calls the external application. For example, the link may be conditionally presented to the user based at least in part on at least one of an aspect of the interactive dialog, a structured data parameter, a user attribute, language in a query from the user, and language from a user-response to a dialog question.

A twelfth illustrative example describes a method of providing content to a user. The method includes organizing concepts into groups representing dimensions of a domain, including ordering a first concept with respect to a second concept in the same group, using at least one structured data parameter, engaging in an interactive dialog between the system and a user to constrain the user's search for needed content based at least in part on information obtained from the user about at least one structured data parameter, and passing at least one structured data parameter to an external application.

One variation on this example includes presenting a user-selectable link for calling the external application. Another example includes conditionally presenting the user-selectable link based at least in part on at least one of an aspect of the interactive dialog, a structured data parameter, a user attribute, language in a query from the user, and language from a user-response to a dialog question.

A thirteenth illustrative example describes a content provider system that includes a multidimensional knowledge map. The knowledge map includes concepts organized along dimensions of the knowledge map into taxonomies. A first concept is ordered with respect to a second concept, within the same first taxonomy, using at least one structured data parameter. The system includes at least one content item including a first tag that tags the at least one item to at least one of the first and second concepts based at least in part on a first structured data parameter that is modified based on an indication derived from at least one previous user's interaction with the system.

In one variation on this example, the first tag also tags the at least one item to at least one of the first and second concepts based on at least one of a second structured data parameter, language associated with the at least one item, and a second tag associated with the at least one item. In another example, the indication is based on whether the at least one previous user's interaction with the system was deemed successful. In yet another example, the indication is based on context information obtained from a dialog interaction with the at least one previous user.

A fourteenth illustrative example describes a method of providing content to a user. The method includes organizing concepts into groups representing dimensions of a domain. This includes ordering a first concept with respect to a second concept in the same group, using at least one structured data parameter. At least one item is tagged to at least one of the first and second concepts based at least in part on a first structured data parameter that is modified based on an indication derived from at least one previous user's interaction with the system.

In one variation on this example, the tagging is also based on at least one of: a second structured data parameter, language associated with the at least one item, and a second tag associated with the at least one item. In another example, the tagging is also based on at least one of whether the at least one previous user's interaction with the system was deemed successful and context information obtained from a dialog interaction with the at least one previous user.

Other aspects of the present systems, devices, and methods will become apparent upon reading the following detailed description and viewing the drawings that form a part thereof.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. Furthermore, all publications, patents, and patent documents referred to in this document are incorporated by reference herein in their entirety, as though individually incorporated by reference. In the event of inconsistent usages between this documents and those documents so incorporated by reference, the usage in the incorporated reference(s) should be considered supplementary to that of this document; for irreconcilable inconsistencies, the usage in this document controls.

Top-Level Example of Content Provider

Figure 1:
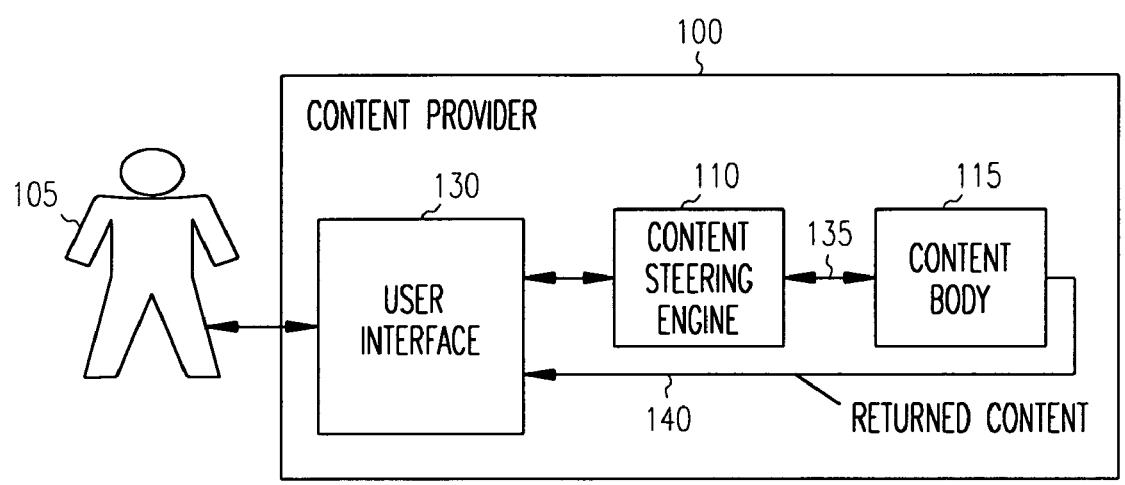
FIG. 1 is a block diagram illustrating generally one example of a content provider illustrating how a user is steered to content.

FIG. 1 is a block diagram illustrating generally one example of a content provider 100 system illustrating generally how a user 105 is steered to content. In this example, user 105 is linked to content provider 100 by a communications network, such as the Internet, using a Web-browser or any other suitable access modality. Content provider 100 includes, among other things, a content steering engine 110 for steering user 105 to relevant content within a body of content 115. In FIG. 1, content steering engine 110 receives from user 105, at user interface 130, a request or query for content relating to a particular concept or group of concepts manifested by the query. In addition, content steering engine 110 may also receive other information obtained from the user 105 during the same or a previous encounter. Furthermore, content steering engine 110 may extract additional information by carrying on an intelligent dialog with user 105, such as described in commonly assigned Fratkina et al. U.S. Patent PRE GRANT PUB. No. 20010049688 entitled "A SYSTEM AND METHOD FOR PROVIDING AN INTELLIGENT MULTI-STEP DIALOG WITH A USER," filed on Mar. 6, 2001, which is incorporated by reference herein in its entirety, including its description of a dialog engine obtaining information from a user by carrying on a dialog.

In response to any or all of this information extracted from the user, content steering engine 110 outputs at 135 indexing information relating to one or more relevant pieces of content, if any, within content body 115. In response, content body 115 outputs at 140 to user interface 130 the relevant content, or a descriptive indication thereof, which is provided to user 105. Multiple returned content "hits" may be unordered or may be ranked according to perceived relevance to the user's query. One embodiment of a retrieval system and method is described in commonly assigned Copperman et al. U.S. patent application Ser. No. 09/912,247, entitled SYSTEM AND METHOD FOR PROVIDING A LINK RESPONSE TO INQUIRY, filed Jul. 23, 2001, which is incorporated by reference herein in its entirety, including its description of a retrieval system and method. Content provider 100 may also adaptively modify content steering engine 110 and/or content body 115 in response to the perceived success or failure of a user's interaction session with content provider 100. One such example of a suitable adaptive content provider 100 system and method is described in commonly assigned Angel et al. U.S. patent application Ser. No. 09/911,841 entitled "ADAPTIVE INFORMATION RETRIEVAL SYSTEM AND METHOD," filed on Jul. 23, 2001, which is incorporated by reference in its entirety, including its description of adaptive response to successful and nonsuccessful user interactions. Content provider 100 may also provide reporting information that may be helpful for a human knowledge engineer {"KE"} to modify the system and/or its content to enhance successful user interaction sessions and avoid nonsuccessful user interactions, such as described in commonly assigned Kay et al. U.S. Patent PRE GRANT PUB. No. 20030018626 entitled, "SYSTEM AND METHOD FOR MEASURING THE QUALITY OF INFORMATION RETRIEVAL," filed on Jul. 23, 2001, which is incorporated by reference herein in its entirety, including its description of providing reporting information about user interactions.

Overview of Example CRM Using Taxonomy-Based Knowledge Map

In one implementation, content provider system 100 uses a content base organized by a knowledge map made up of multiple taxonomies to map a user query to desired content, such as discussed in commonly assigned Copperman et al. U.S. Pat. No. 6,711,585, entitled SYSTEM AND METHOD FOR IMPLEMENTING A KNOWLEDGE MANAGEMENT SYSTEM, filed on Jun. 15, 2000, which is incorporated herein by reference in its entirety, including its description of a multiple taxonomy knowledge map and techniques for using the same. Another efficient and cost-effective implementation provides a guided search using a reduced set of taxonomies that can be at least partially reused for a different entity's content provider implementation, such as discussed in commonly assigned Copperman et al. U.S. Patent PRE GRANT PUB. No. 20030115791, entitled EFFICIENT AND COST-EFFECTIVE CONTENT PROVIDER FOR CUSTOMER RELATIONSHIP MANAGEMENT (CRM) OR OTHER APPLICATIONS, filed on Jan. 14, 2002, which is incorporated herein by reference in its entirety, including its description of an efficient and cost effective guided search implementation.

As discussed in detail in U.S. Pat. No. 6,711,585 (with respect to a CRM system) and incorporated herein by reference, and as illustrated here in the example knowledge map 200 in FIG. 2, documents or other pieces of content (referred to as knowledge containers 201) are mapped by appropriately-weighted tags 202 to concept nodes 205 in multiple taxonomies 210 (i.e., classification systems). In one example, each taxonomy 210 is a directed acyclical graph (DAG) or tree (i.e., a hierarchical DAG) with appropriately-weighted edges 212 connecting concept nodes to other concept nodes within the taxonomy 210 and to a single root concept node 215 in each taxonomy 210. Thus, each root concept node 215 effectively defines its taxonomy 210 at the most generic level. Concept nodes 205 that are further away from the corresponding root concept node 215 in the taxonomy 210 are more specific than those that are closer to the root concept node 215. Multiple taxonomies 210 are used to span the body of content (knowledge corpus) in multiple different orthogonal ways.

As discussed in U.S. Pat. No. 6,711,585 and incorporated herein by reference, taxonomy types include, among other things, topic taxonomies (in which concept nodes 205 represent topics of the content), filter taxonomies (in which concept nodes 205 classify meta-data about content that is not derivable solely from the content itself), and lexical taxonomies (in which concept nodes 205 represent language in the content). Knowledge container 201 types include, among other things: document (e.g., text); multimedia (e.g., sound and/or visual content); e-resource (e.g., description and link to online information or services); question (e.g., a user query); answer (e.g., a CRM answer to a user question); previously-asked question (PQ; e.g., a user query and corresponding CRM answer); knowledge consumer (e.g., user information); knowledge provider (e.g., customer support staff information); product (e.g., product or product family information). It is important to note that, in this document, content is not limited to electronically stored content, but also allows for the possibility of a human expert providing needed information to the user. For example, the returned content list at 140 of FIG. 1 herein could include information about particular customer service personnel within content body 115 and their corresponding areas of expertise. Based on this descriptive information, user 105 could select one or more such human information providers, and be linked to that provider (e.g., by e-mail, Internet-based telephone or videoconferencing, by providing a direct-dial telephone number to the most appropriate expert, or by any other suitable communication modality).

Figure 3:
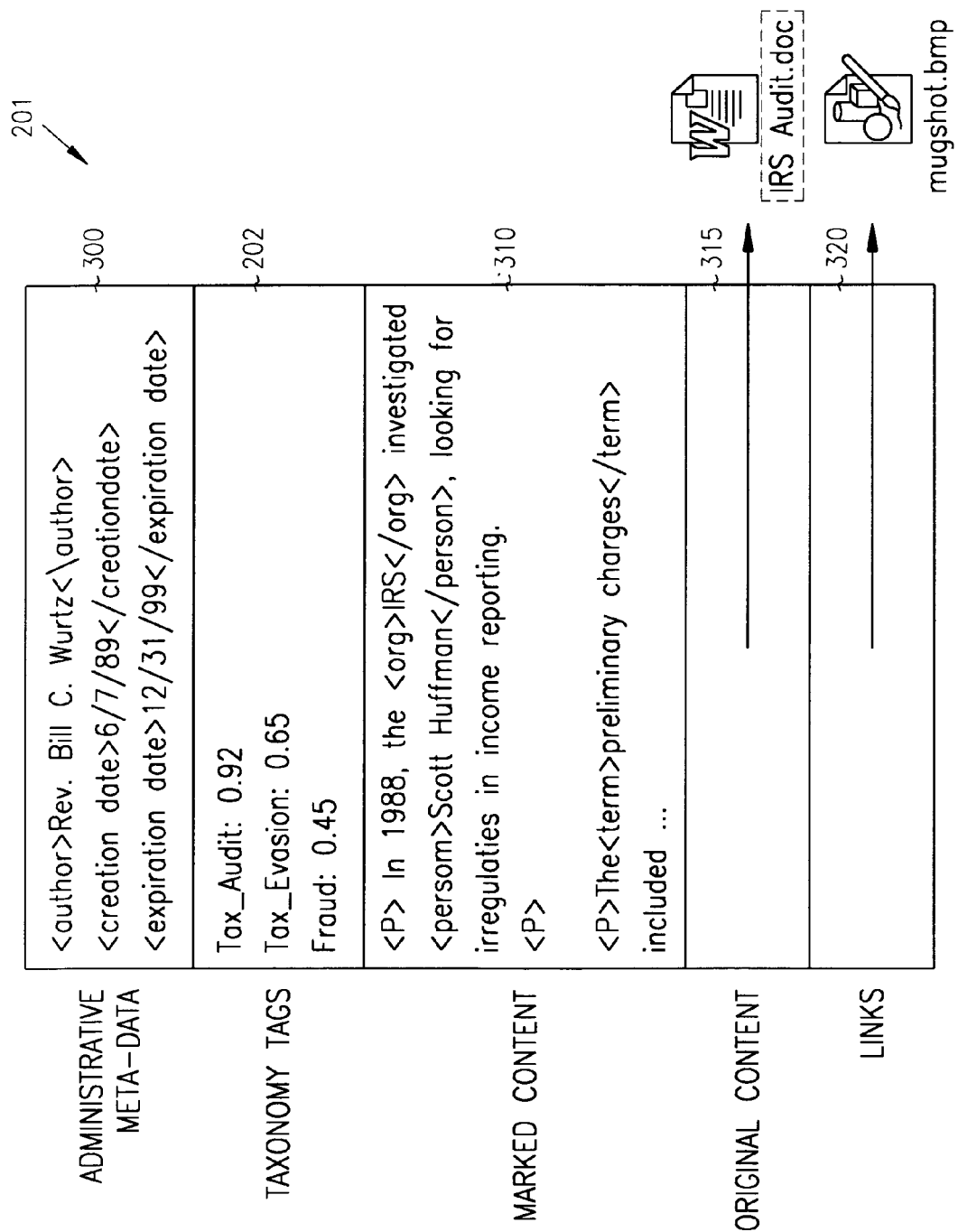
FIG. 3 is a schematic diagram illustrating generally one example of portions of a document-type knowledge container.

FIG. 3 is a schematic diagram illustrating generally one example of portions of a document-type knowledge container 201. In this example, knowledge container 201 includes, among other things, administrative meta-data 300, contextual taxonomy tags 202, marked content 310, original content 315, and links 320. Administrative meta-data 300 may include, for example, structured fields carrying information about the knowledge container 201 (e.g., who created it, who last modified it, a title, a synopsis, a uniform resource locator (URL), etc. Such meta-data need not be present in the content carried by the knowledge container 201. Taxonomy tags 202 provide context for the knowledge container 201, i.e., they map the knowledge container 201, with appropriate weighting, to one or more concept nodes 205 in one or more taxonomies 210. In one example, knowledge containers 201 matching concept node constraints are retrieved by using a search engine to perform a text search for the string(s) (e.g., "Tax_Audit" of the constraining concept nodes. In a further example, other taxonomy tag(s) 202 are also included to denote hierarchical "parent" concept node(s) to which the knowledge container 201 is not necessarily tagged directly. In one illustrative example, a knowledge container 201 tagged to a concept node below the "Tax_Audit" concept node in the hierarchical taxonomy includes an "under_Tax_Audit" taxonomy tag 202. Therefore, by including tags 202 to all parent concepts, the search engine can be used to perform a text search to retrieve knowledge containers 201 tagged to any concept node below a specified concept node. Marked content 310 flags and/or interprets important, or at least identifiable, components of the content using a markup language (e.g., hypertext markup language (HTML), extensible markup language (XML), etc.). Original content 315 is a portion of an original document or a pointer or link thereto. Links 320 may point to other knowledge containers 201 or location of other available resources.

U.S. Pat. No. 6,711,585 also discusses in detail techniques incorporated herein by reference for, among other things: (a) creating appropriate taxonomies 210 to span a content body and appropriately weighting edges in the taxonomies 210; (b) slicing pieces of content within a content body into manageable portions, if needed, so that such portions may be represented in knowledge containers 201; (c) autocontextualizing ("topic spotting") the knowledge containers 201 to appropriate concept node(s) 205 in one or more taxonomies, and appropriately weighting taxonomy tags 202 linking the knowledge containers 201 to the concept nodes 205; (d) indexing knowledge containers 201 tagged to concept nodes 205; (e) regionalizing portions of the knowledge map based on taxonomy distance function(s) and/or edge and/or tag weightings; and (f) autocontextualizing ("topic spotting") user query features to matching evidence features ("concept features") of concept node(s) 205 to constrain the user's search for content, and returning relevant content.

It is important to note that the user's request for content need not be limited to a single query. Instead, interaction between user 105 and content provider 100 may take the form of a multi-step dialog. One example of such a multi-step personalized dialog is discussed in commonly assigned Fratkina et al. U.S. Patent PRE GRANT PUB. No. 20010049688 entitled, A SYSTEM AND METHOD FOR PROVIDING AN INTELLIGENT MULTI-STEP DIALOG WITH A USER, filed on Mar. 6, 2001, the dialog description of which is incorporated herein by reference in its entirety. That patent document discusses a dialog model between a user 105 and a content provider 100. It allows user 105 to begin with an incomplete or ambiguous problem description. Based on the initial problem description, a "topic spotter" directs user 105 to the most appropriate one of many possible dialogs. By engaging user 105 in the appropriately-selected dialog, content provider 100 elicits unstated elements of the problem description, which user 105 may not know at the beginning of the interaction, or may not know are important. It may also confirm uncertain or possibly ambiguous assignment, by the topic spotter, of concept nodes to the user's query by asking the user explicitly for clarification. Using the particular path that the dialog follows (i.e., "context" gleaned from the dialog session), content provider 100 discriminates against irrelevant content, thereby efficiently guiding user 105 to relevant content.

The context gleaned from the dialog yields information about the user 105 (e.g., skill level, interests, products owned, services used, etc.). The user's session, including the particular dialog path taken (e.g., clickstream and/or language communicated between user 105 and content provider 100), also yields information about the relevance of particular content to the user's needs. For example, if user 105 leaves the dialog (e.g., using a "Back" button on a Web-browser) without reviewing content returned by content provider 100, a nonsuccessful user interaction (NSI) may, in one example, be inferred. In another example, if user 105 chooses to "escalate" from the dialog with automated content provider 100 to a dialog with a human expert, this may, in one example, also be interpreted as an NSI. Moreover, the dialog may provide user 105 an opportunity to rate the relevance of returned content, or of communications received from content provider 100 during the dialog. As discussed above, one or more aspects of the interaction between user 105 and content provider 100 may be used as a feedback input for adapting content within content body 115, or adapting the way in which content steering engine 110 guides user 105 to needed content.

Example of System Assisting in Associating Intelligence with Content

Figure 4:
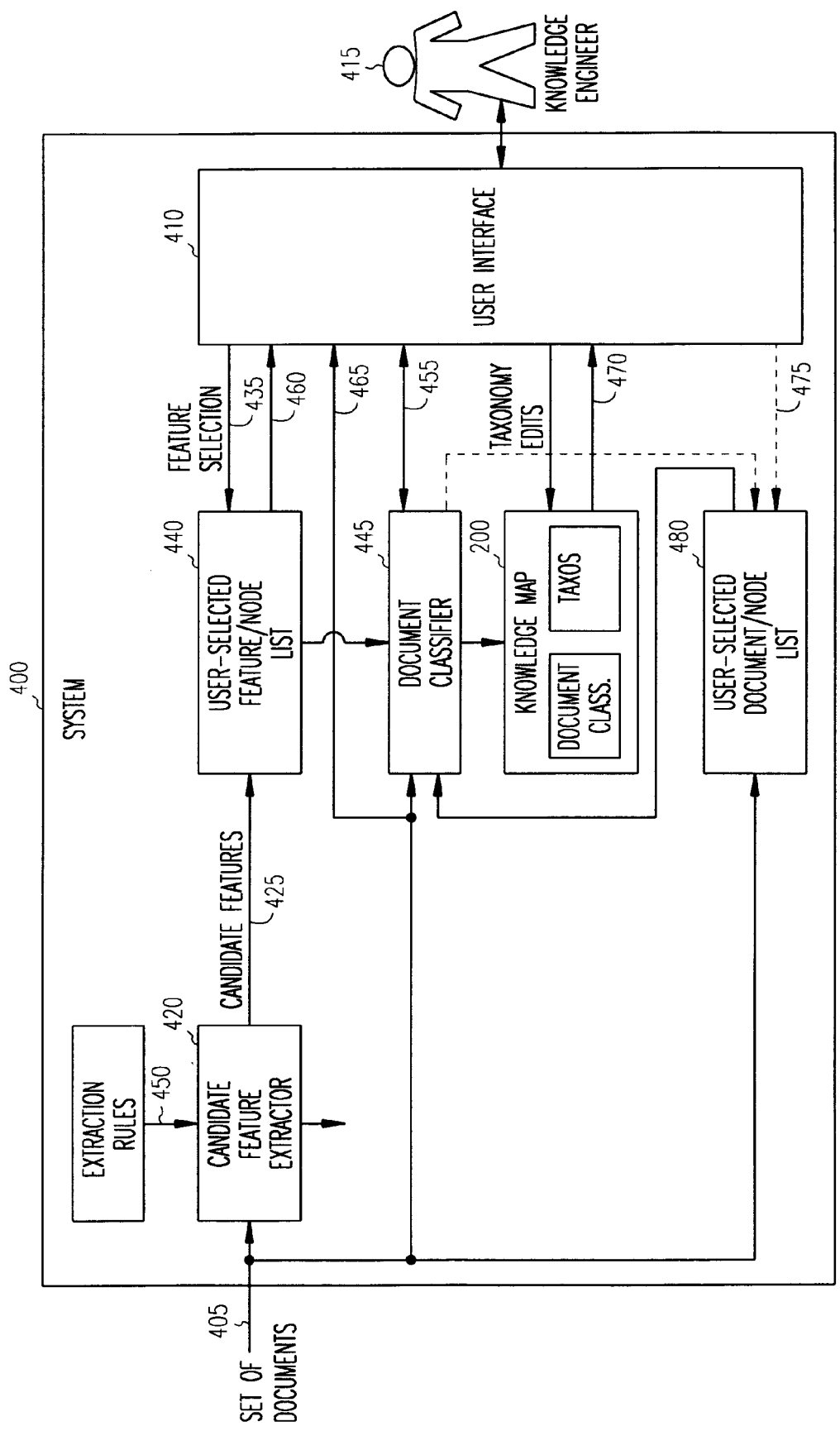
FIG. 4 is a block diagram illustrating generally one example of a system for assisting a knowledge engineer in associating intelligence with content.

FIG. 4 is a block diagram illustrating generally one example of a system 400 for assisting a knowledge engineer in associating intelligence with content. In the example of system 400 illustrated in FIG. 4, the content is organized as discussed above with respect to FIGS. 2 and 3, for being provided to a user such as discussed above with respect to FIG. 1. System 400 includes an input 405 that receives body of raw content. In a CRM application, the raw content body is a set of document-type knowledge containers ("documents"), in XML or any other suitable format, that provide information about an enterprise's products (e.g., goods or services). System 400 also includes a graphical or other user input/output interface 410 for interacting with a knowledge engineer 415 or other human operator.

In FIG. 4, a candidate feature selector 420 operates on the set of documents obtained at input 405. Without substantial human intervention, candidate feature selector 420 automatically extracts from a document possible candidate features (e.g., text words or phrases; features are also interchangeably referred to herein as "terms") that could potentially be useful in classifying the document to one or more concept nodes 205 in the taxonomies 210 of knowledge map 200. The candidate features from the document(s), among other things, are output at node 425.

Assisted by user interface 410 of system 400, a knowledge engineer 415 selects at node 435 particular features, from among the candidate features or from the knowledge engineer's personal knowledge of the existence of such features in the documents; these user-selected features are later used in classifying ("tagging") documents to concept nodes 205 in the taxonomies 210 of knowledge map 200. A feature typically includes any word or phrase in a document that may meaningfully contribute to the classification of the document to one or more concept nodes. The particular features selected by the knowledge engineer 415 from the candidate features at 425 (or from personal knowledge of suitable features) are stored in a user-selected feature/node list 440 for use by document classifier 445 in automatically tagging documents to concept nodes 205. For tagging documents, classifier 445 also receives taxonomies 210 that are input from stored knowledge map 200.

In one example, as part of selecting particular features from among the candidate features or other suitable features, the knowledge engineer also associates the selected features with one or more particular concept nodes 205; this correspondence is also included in user-selected feature/node list 440, and provided to document classifier 445. Alternatively, system 400 also permits knowledge engineer 415 to manually tag one or more documents to one or more concept nodes 205 by using user interface 410 to select the document(s) and the concept node(s) to be associated by a user-specified tag weight. This correspondence is included in user-selected document/node list 480, and provided to document classifier 445. As explained further below, user interface 410 performs one or more functions and/or provides highly useful information to the knowledge engineer 415, such as to assist in tagging documents to concept nodes 205, thereby associating intelligence with content.

In one example, candidate feature extractor 420 extracts candidate features from the set of documents using a set of extraction rules that are input at 450 to candidate feature selector 420. Candidate features can be extracted from the document text using any of a number of suitable techniques. Examples of such techniques include, without limitation: natural language text parsing, part-of-speech tagging, phrase chunking, statistical Markoff modeling, and finite state approximations. One suitable approach includes a pattern-based matching of predefined recognizable tokens (for example, a pattern of words, word fragments, parts of speech, or labels (e.g., a product name)) within a phrase. Candidate feature selector 420 outputs at 425 a list of candidate features, from which particular features are selected by knowledge engineer 415 for use by document classifier 445 in classifying documents.

Candidate feature selector 420 may also output other information at 425, such as additional information about these terms. In one example, candidate feature selector 420 individually associates a corresponding "type" with the terms as part of the extraction process. For example, a capitalized term appearing in surrounding lower case text may be deemed a "product" type, and designated as such at 425 by candidate feature selector 420. In another example, candidate feature selector 420 may deem an active verb term as manifesting an "activity" type. Other examples of types include, without limitation, "objects," "symptoms," etc. Although these types are provided as part of the candidate feature extraction process, in one example, they are modifiable by the knowledge engineer via user interface 410.

In classifying documents, document classifier 445 outputs edge weights associated with the assignment of particular documents to particular concept nodes 205. The edge weights indicate the degree to which a document is related to a corresponding concept node 205 to which it has been tagged. In one example, a document's edge weight indicates: how many terms associated with a particular concept node appear in that document; what percentage of the terms associated with a particular concept node appear in that document; and/or how many times such terms appear in that document. Although document classifier automatically assigns edge weights using these techniques, in one example, the automatically-assigned edge weights may be overridden by user-specified edge weights provided by the knowledge engineer. The edge weights and other document classification information is stored in knowledge map 200, along with the multiple taxonomies 210. One example of a device and method(s) for implementing document classifier 445 is described in commonly assigned Ukrainczyk et al. U.S. patent application Ser. No. 09/864,156, entitled A SYSTEM AND METHOD FOR AUTOMATICALLY CLASSIFYING TEXT, filed on May 25, 2001, which is incorporated herein by reference in its entirety, including its disclosure of a suitable example of a text classifier.

Document classifier 445 also provides, at node 455, to user interface 410 a set of evidence lists resulting from the classification. This aggregation of evidence lists describes how the various documents relate to the various concept nodes 205. In one example, user-interface 410 organizes the evidence lists such that each evidence list is associated with a corresponding document classified by document classifier 445. In this example, a documents evidence list includes, among other things, those user-selected features from list 440 that appear in that particular document. In another example, user-interface 410 organizes the evidence lists such that each evidence list is associated with a corresponding concept node to which documents have been tagged by document classifier 445. In this example, a concept node's evidence list includes, among other things, a list of the terms deemed relevant to that particular concept node (also referred to as "concept features"), a list of the documents in which such terms appear, and respective indications of how frequently a relevant term appears in each of the various documents. In addition to the evidence lists, classifier 445 also provides to user interface 410, among other things: the current user-selected feature list 440, at 460; links to the documents themselves, at 465; and representations of the multiple taxonomies, at 470. In sum, FIG. 4 illustrates certain aspects of a system 400 for assisting a knowledge engineer in associating intelligence with content. Other aspects of system 400, including techniques for its use are described in commonly assigned Waterman et al. U.S. Patent PRE GRANT PUB. 20030084066 entitled "DEVICE AND METHOD FOR ASSISTING KNOWLEDGE ENGINEER IN ASSOCIATING INTELLIGENCE WITH CONTENT," filed on Oct. 31, 2001, which is incorporated herein by reference in its entirety, including its description of system 400 and techniques for its use.

Overview of Using Structured Data

Figure 5:
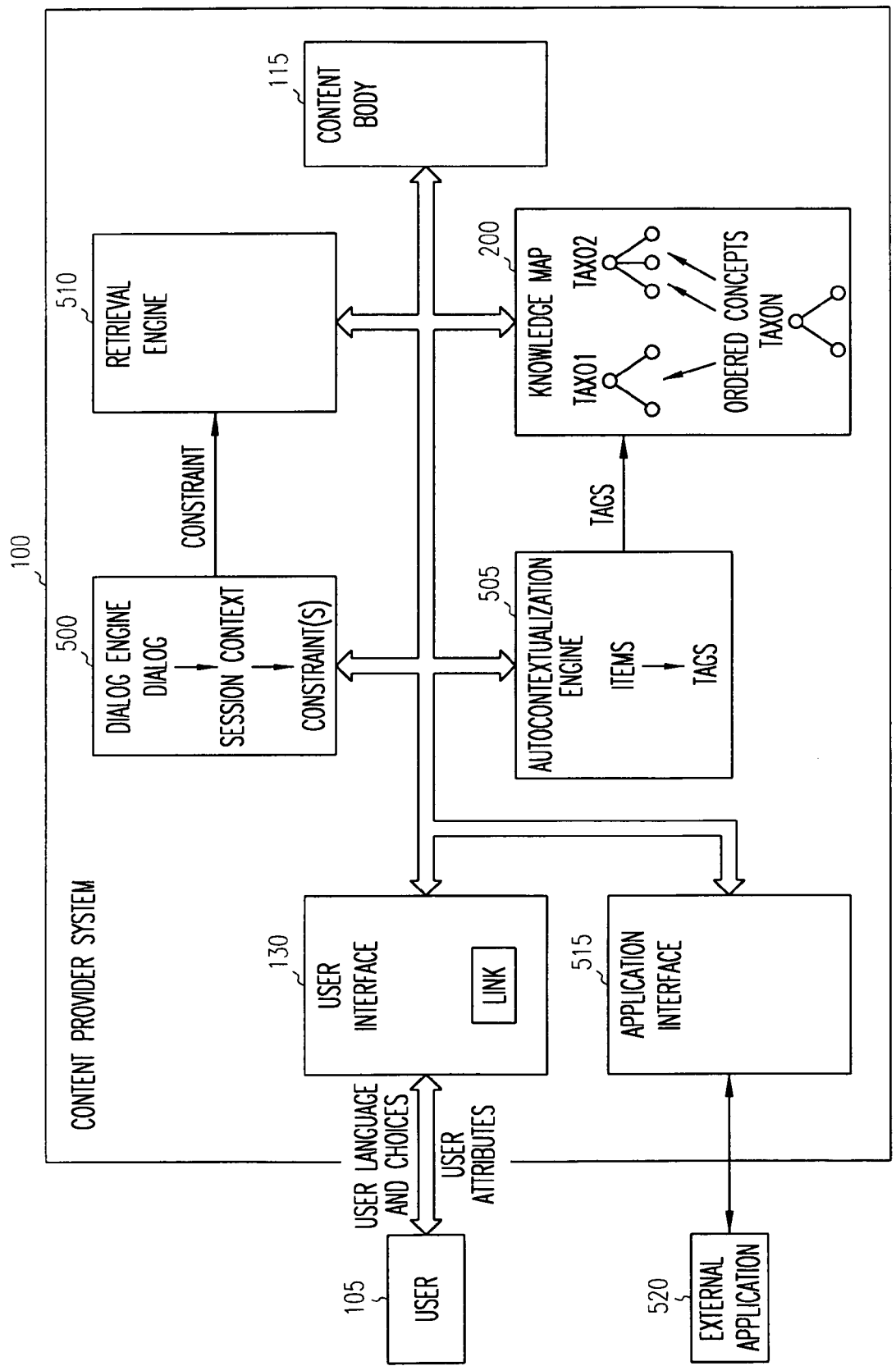
FIG. 5 is a schematic/block diagram illustrating generally another conceptualization of a content provider system.

FIG. 5 is a schematic/block diagram illustrating generally, by way of example, but not by way of limitation, another conceptualization of a content provider system 100. In this example, content provider system 100 includes a user interface 130, content body 115, and knowledge map 200. In this example, system 100 also includes a dialog engine 500, as discussed and incorporated above, to carry out a dialog with the user 105. The dialog that occurs during a user-provider session accumulates session context, which may result in one or more constraints that constrain the user's search to one or more appropriate portions of knowledge map 200. In this example, system 100 also includes an autocontextualization engine 505, such as discussed and incorporated above, for classifying and/or tagging items (e.g., language or attributes from user queries; documents, resources, or other content in content body 115) to concepts 205 in knowledge map 200. In this example, content provider system 100 also includes a retrieval engine 510, such as discussed and incorporated above, for retrieving documents, resources, and/or other content using the constraints, if any, obtained from dialog engine 500. In one example, retrieval engine 510 also includes a text search engine for retrieving content resources based on their associated textual content, which may, but need not, also use knowledge map constraints, if any.

In one example, as discussed above, dialog engine 500 of content provider system 100 conducts an interactive dialog with a user 105 to guide the user 105 to relevant resources—such as documents, frequently-asked-questions, multimedia content, data items, applications, other users, experts, communities, company resources, etc. of content body 115. Portions of such content resources may reside external to content provider system 100. In one embodiment, the dialog uses structured data having a range of possible ordered or orderable values. Examples of such structured data include XML or other attributes with values that include numbers (e.g., integers, floats), dates (or times, or dates and times), or strings. In one example, one or more such structured data attributes are associated with a document or other resource to which the user 105 is guided. In another example, one or more such attributes are associated with the user 105. In a further example, one or more such attributes are associated with an instance of the interactive user-provider dialog session.

In one example, structured data attributes are predeclared within content provider system 100, thereby defining the type of structured data associated with the attribute. Illustrative examples of such declarations of structured data attributes include:

int nGumby;
string sMyString;
float nRatio; and
date dBirthday.

In a further example, content provider 100 includes the ability to remove such structured data attributes, such as by using a "drop" command (e.g., "drop int nGumby").

In a financial application example of content provider system 100, at least some of the retrievable documents in content body 115 include XML or other structured meta-data attributes separately from the textual content of the document, such as date-of-publication (including a value that is a date), companyticker (including a string value representing the stock-exchange ticker symbol of a company discussed in the document), companyPE (including a floating point value representing the price-to-earnings ratio of the company discussed in the document), and the like.

In another example of such a content provider system 100 in a financial application, one or more users of such a system are represented as data objects within system 100. In this example, at least some of such user data objects include at least one user attribute using structured data such as age, address, state-of-residence, date-user-became-a-customer, date-user-last-executed-a-stock-trade, and the like.

In a further example, such structured data is used by the dialog engine 500, described and incorporated above, to interact with a user 105. In this example, the dialog engine 500 drives an interactive user-provider dialog to steer a user 105 to needed content in content body 115 by constraining a knowledge map 200 based on, among other things: user attributes; session context information gleaned from the user-provider interaction; and/or how the content relates to various portions of the knowledge map 200.

In another example of the financial application, one taxonomy 210 of the knowledge map 200 includes concepts 205 representing industries (e.g., petroleum, healthcare, technology, etc.), another taxonomy 210 classifies companies as public or private, another includes geographic locations, another classifies according to investment type (e.g., stocks, bonds, etc.), another categorizes risk-levels (e.g., high, medium, low, etc.), another includes an analyst's rating of the investment (e.g., strong buy, buy, hold, etc.), another captures the user's expertise level at investing (novice, intermediate, expert, etc.). This type of multi-dimensional knowledge map 200 is powerful because it allows various aspects of the domain to be represented together. Individual resources to be retrieved are tagged to the various dimensions of the knowledge map 200. The set of tags 202 of a particular item to the knowledge map 200 can be conceptualized as providing a representation of that tagged item. User attributes and/or user-provider interactions constrain the user's session to portions of the knowledge map 200 so as to steer user 105 toward desired content. So, in one example, a certain analyst's report about a particular company, "FooCo," in the petroleum industry, is tagged to "FooCo" in a "company" taxonomy, to "petroleum" in the "industry" taxonomy, to "stock" in the "investment-type" taxonomy, to "medium" in the "risk-level" taxonomy, to "Texas" in the "geographic location" taxonomy, and to "strong buy" in the "analysts' rating" taxonomy.

In one example, content provider system 100 includes a knowledge-map driven dialog engine 500 that includes automated text-classification capabilities that effectively deal with unstructured resources (e.g., textual documents) to be retrieved, and with the unstructured pieces of an interaction with a user—such as a textual query from the during the user-provider interaction. By automatically mapping ("autocontextualizing") these unstructured elements to the multi-dimensional knowledge map 200, an intelligent dialog guides the interaction, such as by asking the user 105 follow-up questions to focus the interaction in one or more particular places in the knowledge map 200. The combined ability of content provider system 100 to automatically map unstructured data into a structured, multi-dimensional knowledge map 200, and to then create a guided interaction through the multi-dimensional knowledge map 200 to guide a user 105 to resources of interest to that user 105, provides a very powerful, focused way to guide users to the information and resources they are looking for, even when the space of resources that can be retrieved is very large.

In one example, content provider system 100 also includes the ability to make use of structured data within the same or similar multi-dimensional knowledge map 200 framework. This allows dialog interactions with users that use a combination of structured data and unstructured (e.g., textual) information, to retrieve resources, some of which may include both structured data attributes and unstructured (textual) information.

In one example, the dialog engine 500 of content provider system 100 asks follow-up questions directly about structured data values of user interest. Then, the dialog engine 500 uses the user's answers to constrain or prefer (e.g., order and present, via user interface 130, as being ranked higher) particular resources to be retrieved, such as within a dialog that also includes an unstructured user query. In one example, the follow-up questions are generated from taxonomies 210 in the knowledge map 200. In the illustrative financial services application, a user 105 may type in the query "looking for highly rated companies." In this example, the textual information in the user query is processed by dialog engine 500 to trigger a follow-up question presented to the user 105 through user interface 130, "What range of P/E ratios are you interested in? Between ( ) and ( )." It also triggers another follow-up question "What industry are you interested in?" with a pull-down menu of industries represented by concepts 205 in the industry taxonomy 215 of the knowledge map 200. By typing numbers into accompanying type-in boxes displayed on the user interface 130, and/or choosing from the pull-down menu industry choices, the user 105 provides system 100 with structured data and/or a direct specification of relevant concepts 205 in the knowledge map 200. In one example, dialog engine 500 uses this structured data information to constrain and/or order the resources/content retrieved and returned to user 105.

In one example, autocontextualization engine 505 also includes the ability to automatically map structured data values into knowledge map concepts 205 in addition to autocontextualizing unstructured data (e.g., text) to knowledge map concepts 205. As an illustrative example of such auto-mapping of structured data to one or more concepts 205, a structured data value of a user attribute, such as "age=26," associated with a particular user 105, is auto-mapped to a concept 205, such as "young-person" in the knowledge map 200. In another illustrative example, a user-provided structured data attribute such as "priceearningsratio=100" is mapped to a concept 205 such as "high-pe-ratio" in a taxonomy 210 with concepts 205 representing price-to-earnings ratio types or ranges. In this way, structured data values, which may have a broad range of allowable values, are discretized or classified into a finite, well-defined set of values allocated to particular concepts 205 that are used as part of the user-provider dialog interaction. In one such illustrative example, the user 105 is asked, "What range of P/E ratios are you interested in?" and is presented a pull-down menu or other selection of ordered concepts 205 to choose from, from the P/E ratios taxonomy, such as "negative-P/E-ratios," "low-P/E-ratios," and "high-P/E-ratios."

The functions mapping structured data values to concepts 205 of knowledge map 200 may be arbitrarily complex. In one example, the auto-mapping is based on one or more range specifications on the structured data, such as the mapping of an "age" between 0 and 30 years to the concept "young-person." However, examples of other more complex mapping functions use any combination of mathematics, rules, heuristics, and/or logic. Moreover, further examples of mapping functions are capable of combining multiple structured data values. In one example, the mapping function incorporates information from other tags of the item being auto-mapped. In another example, the mapping function is also based on one or more unstructured elements of the item, and the like. Furthermore, the ranges of values that map to each concept 205 may overlap, and/or the set of corresponding ordered concepts 205 need not completely cover all possible values of the structured data attribute. In an illustrative example, an "age" between 0 and 40 years young maps to "young-person" and an "age" between 30 to 60 maps to "middle-aged." Thus, there need not be a one-to-one correspondence between a particular structured data value and the mapped concept(s) 205.

In a further example, one or more of the functions used to auto-map structured data values to concepts 205 are learned and/or modified by content provider system 100. In one example, such learning and/or modification is based on usage data over time, and/or other data from outside dialog engine 500, using any feedback-based machine learning technique or algorithm. Examples of such techniques are described in commonly assigned Angel et al. U.S. patent application Ser. No. 09/911,841 entitled "ADAPTIVE INFORMATION RETRIEVAL SYSTEM AND METHOD," filed on Jul. 23, 2001, which is incorporated by reference in its entirety, including its description of adaptive response to successful and non-successful user interactions. As an illustrative example, in the financial application discussed above, users are registered as "high risk," "middle risk," or "risk-averse." Over time, these users select analyst reports to read on various potential investments, and this usage of the content provider system 100 is logged. In this example, a machine learning algorithm is applied to learn a mapping function from the attributes of each such potential investment (e.g., type, P/E ratio, price, industry, analyst's rating, etc.) to a structured data attribute with a value representing the typical risk profile for that investment.

In another example, using structured data as one basis, content provider system 100 orders, partially orders, or modifies an existing order of knowledge map concepts 205. In one example, concepts 205 are ordered, within a taxonomy 210, using parent/child relationships. In another example, concepts 205 are ordered, within a taxonomy 210, using named relationships between concepts 205, such as "is-a" or "part-of." In a further example, concepts 205 are ordered within a taxonomy 210 so as to represent subranges of a range of structured data values. One such example expresses such ordered relationship between concepts 205 as being "left-of" or "right of" to indicate where such concepts 205 fall with respect to each other on a linear representation of the range of values taken by the structured data. As an illustrative example, in a P/E ratios taxonomy, "negative-P/E-ratios" is left-of "low-P/E-ratios," which is left-of "medium-P/E-ratios," which is left-of "high-P/E-ratios," which is left-of enormous-P/E-ratios. However, all concepts 205 in a particular taxonomy 210 need not have ordered relationships; such ordering may be partial.

In one example, based on these ordered relationships, the dialog engine 500 of system 100 provides the user 105 with a dialog question that asks the user 105 to select a "range" within an ordered group of concepts 205. As an illustrative example, the dialog engine 500 asks the user 105 whether the user 105 is interested P/E ratios "less than medium-P/E-ratios" or "between low-P/E-ratios and high-P/E-ratios." This example allows the user 105 to indicate preferences or constraints to be placed on the content to be retrieved. Such preferences or constraints are based at least in part on structured data values (or on a combination of multiple such structured values, or on a combination of structured and unstructured values, depending on the auto-mapping function used to map resources to concepts 205)-without the user 105 having to indicate specific data values. To see one example of why this may be valuable, consider the illustrative financial example discussed above. A novice investor might not know what is considered a low P/E ratio in the industry he or she is asking about, but they may know they are only interested in low P/E ratio stocks. Through auto-mapping and ordered concepts 205, a financial institution hosting content provider system 100 uses its expertise to auto-map, for instance, appropriate ranges of P/E ratios for each industry, and the novice investors using system 100 need only indicate what type of P/E ratios they want to look at.

In one example, the knowledge-map driven dialog engine 500 of content provider system 100 displays follow-up questions (and/or particular user-selectable choices associated with such follow-up questions) that are conditionally based on user attributes particular to the user 105 and/or to the user-provider dialog interaction session. In a first further example, content provider system 100 similarly conditionally presents (or withholds from presenting) to the user 105 one or more follow-up questions that ask about one or more structured data values. In a second further example, system 100 similarly conditionally presents or withholds follow-up questions generated from ordered concepts 205 within a taxonomy 210. In a third further example, system 100 combines the first two further examples, and allows the use of conditionally presented follow-up questions from other types of taxonomies 210 (e.g., without concepts 205 being ordered using structured data). In the illustrative financial services example, a user 105 tagged as a "novice-investor" is presented a P/E ratio question from the taxonomy 210 having ordered concepts 205 (e.g., such a novice investor is given a choice between negative-P/E-ratios, low-P/E-ratios, medium-PIE-ratios, etc.). An expert-investor, however, is presented with a question about P/E ratios that allows user-entry of actual structured data values (e.g., "What range of P/E ratios are you interested in? Between [ ] and [ ]".)

Examples of Using Structured Data

As discussed above, structured data may be obtained from a user query. In one example, structured data in a user query is used to constrain the search space. For example, a user query including "All widgets that cost $5" constrains the search to content on products that cost less than $5. In another example, a user query including "All widgets that cost between $2 and $5" constrains the search, using a low value constraint and a high value constraint, to content on products that cost between $2 and $5. In one example, the user query includes a user-selection of a range using user-interface dialog boxes for entering a structured data value, as well as pull down menu, or the like, allowing the user to specify a less than operator, a greater than operator, or an equal to operator for defining the structured data value or range of values. In various examples, such operators are used in conjunction with structured data that includes numbers, strings, and/or dates (e.g., "people with names starting between A and B"; "widgets with a price less than $5"; "documents contributed later than May 1, 2000"). Moreover, in one example, such structured data inputs (e.g., values & operators) may be combined in constraints with unstructured data (e.g., textual constraints) to an unlimited degree (e.g., "widgets that cost less than $5 that are helpful in underwater applications that were authored after May 11, 2000 and that discuss the telecom industry"). In one example, structured data is used for constraining the user's session to one or more particular portions of knowledge map 200, but is not used for preferring (e.g., displaying as being ranked higher) certain returned documents over other returned documents. In another example, structured data is used for both constraining the user's session to one or more particular portions of knowledge map 200, and is also used for preferring (e.g., displaying as being ranked higher) certain returned documents over other returned documents.

In another example, structured data is mapped to an "ordered taxonomy," i.e., a taxonomy 210 including at least some concept nodes 205 that, in a default mapping, are ordered with respect to each other based on a range of values of one or more structured data elements. In one example, a function callout allows structured data to be algorithmically mapped to an ordered taxonomy by code residing outside of content provider 100. Using such a function callout allows any function to be used to map from a single structured data value (or a set of structured data values) for different attributes to an ordered taxonomy concept node tag (or set of concept node tags), even if the code for computing the function was not built into the code for the content provider system 100. Because the function can be external to the content provider system's code in this way, it can also be dependent on data from any other system, even if that data is outside of the content provider system 100, or is not directly accessible from within the content provider system 100.

Figure 2:
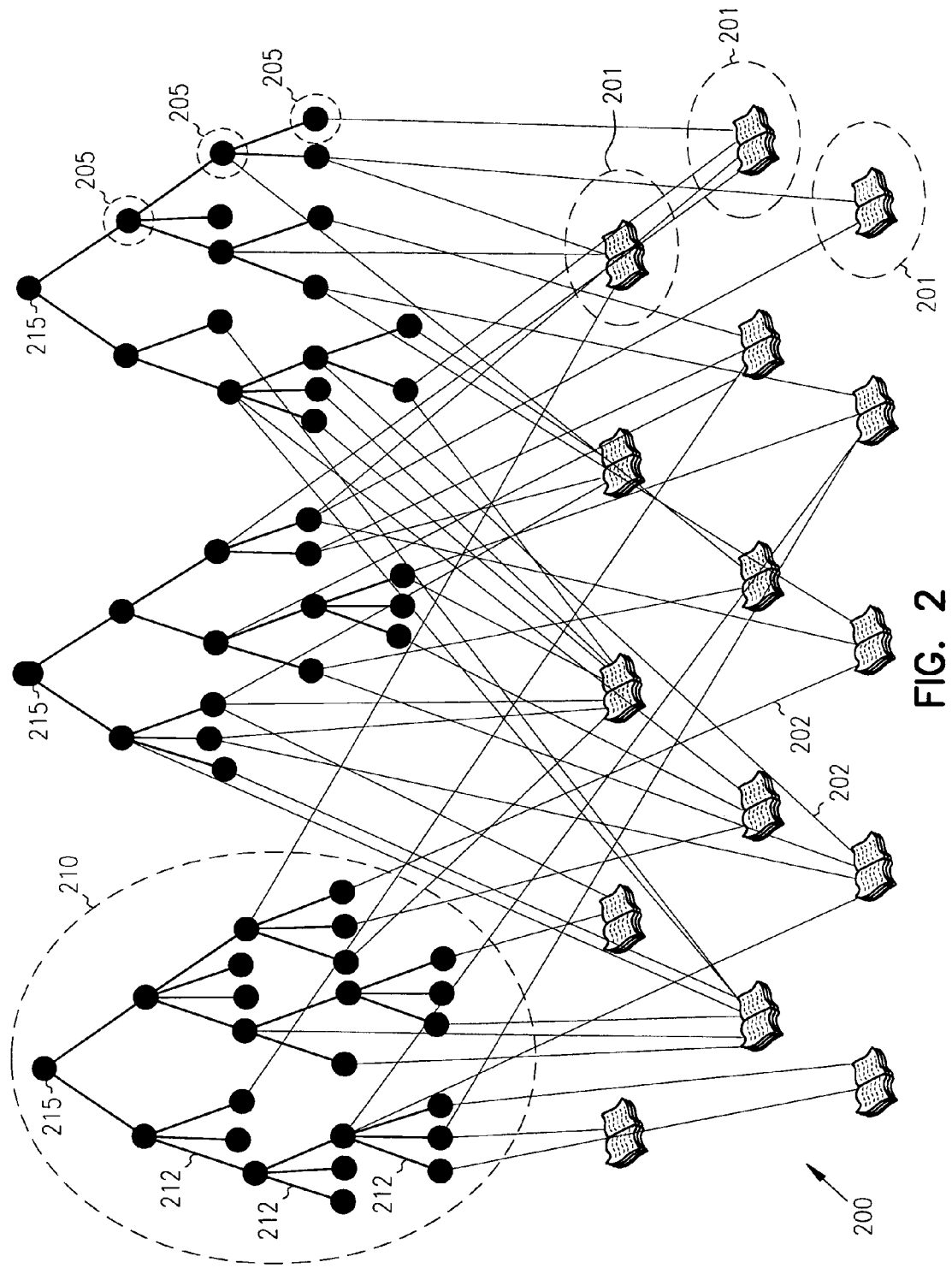
FIG. 2 is an example of a knowledge map.
Figure 6:
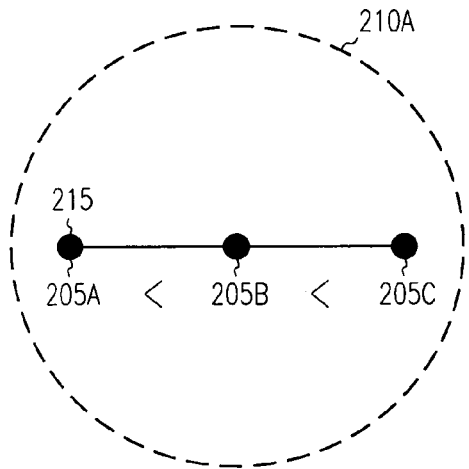
FIG. 6 is a schematic illustration of one example of an ordered taxonomy.

The "ordered taxonomies" need not be DAGs or even hierarchical, as illustrated in FIG. 2. Instead, such ordered taxonomies may be flat, or may be hierarchical only to the extent that they provide a root node, as illustrated in examples of FIGS. 6 and 7. In FIG. 6, ordered taxonomy 210A includes ordered concepts 205A, 205B, and 205C. Concepts 205A, 205B, and 205C are ordered using one or more structured data values. In one example, such concepts are ordered from "left to right," from "smallest" to "largest" value, e.g., 205A<205B<205C. In another example, such concepts are ordered from "left to right," from "largest" to "smallest" value, e.g., 205A>205B>205C. Moreover, in the example of FIG. 6, node 205A also serves as the root node 215 for the illustrated ordered taxonomy 210A. Such ordered concepts of an ordered taxonomy can be conceptually analogized to a number line in which a delimited range is mapped to each concept node. In contrast to a hierarchical taxonomy, which may be constrained to a portion of the taxonomy that is "under" a particular concept, an ordered taxonomy may be constrained using "less than" and "greater than" (or, "to the left of" and "to the right of") operators. In an alternative embodiment, however, the ordering of the taxonomy of FIG. 6 is represented hierarchically (e.g., concept 205C is "under" concept 205B is "under" concept 205A) to similarly delimit ranges of values that are mapped to particular concept nodes 205.

In one example, knowledge containers 201 or other items that are auto-mapped to concepts 205 based on structured data values all receive like tag weights (e.g., a tag weight of 1.0). Ordered concepts (such as 205A, 205B, and 205C) may also include both structured data evidence of an ordered concept 205 and textual evidence associated with the ordered concept. This allows knowledge containers 201, user queries, user selections, user attributes, or like items to also be autocontextualized to the ordered concept using such textual evidence. In one example, however, a tag weight based on textual autocontextualization is overridden by a tag weight based on auto-mapping using structured data. In a further example, a human engineer is allowed to override a tag weight regardless of whether the tag weight was generated using structured data or non-structured data.

Figure 7:
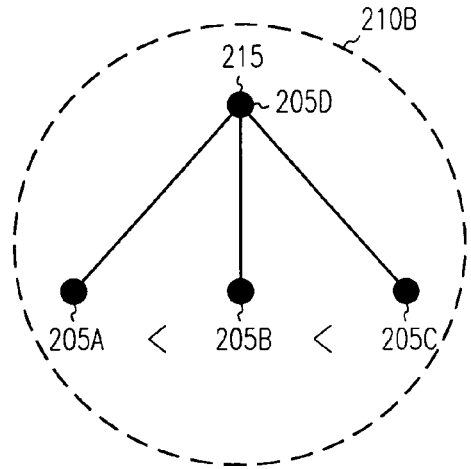
FIG. 7 is a schematic illustration of another example of an ordered taxonomy.

In FIG. 7, ordered taxonomy 210B includes concepts 205A, 205B, 205C, and 205D, in which 205D also serves as a root node 215 encompassing the other concepts, which can be ordered as 205A<205B<205C using one or more structured data values. In one example, ordered taxonomy 210B includes root node 215, which identifies a particular structured data attribute, and a set of ordered concepts 205A, 205B, 205C that auto-map particular ranges of values of the structured data attribute to such ordered concepts.

Figure 8:
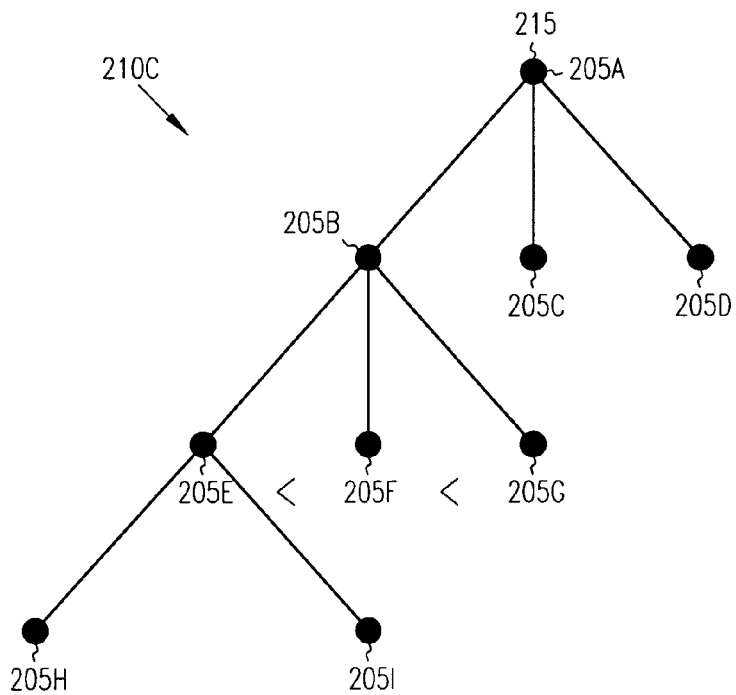
FIG. 8 is a schematic illustration of a partially ordered taxonomy.

In an alternative example, one or more taxonomies 210 may be partially ordered, that is, such a taxonomy 210 may include both ordered and unordered concepts, as illustrated in FIG. 8. In FIG. 8, taxonomy 210C includes concept 205A, serving as a root node 215 and unordered concepts 205B, 205C, and 205D. Underlying concept 205B are the ordered concepts 205E, 205F, and 205G, which are ordered in this example using one or more structured data values as 205E<205F<205G. Underlying ordered concept 205E are unordered concepts 205H and 205I.

In one example, ordered taxonomies support auto-mapping of queries or other items to concepts, analogous to autocontextualization with respect to regular unordered taxonomies. In one example, the structured data is obtained from the user via an input box that is separate or distinct from other user text or language being parsed. In one example, a user-provider dialog uses structured data, such as by creating one or more structured data goals. In one example, a structured data goal governs how a user query maps to one or more portions of the knowledge map 200. In one example, such a structured data goal obtained from the user query results in one or more follow-up dialog questions that eventually yield one or more range constraints on one or more structured data attributes governing the ordering of concepts within the knowledge map 200.

In another example, structured data is obtained from a user attribute. Dialog engine 500, or other portion of content provider system 100, includes a memory that stores a "user object." The stored user object includes one or more structured data or other user attributes associated with a present or prior user. One illustrative example of such a structured data user attribute is the length of time that a particular user is willing to wait for a shipment of a product, which is tagged to one or more concepts in set of ordered concepts. Dialog engine 500 is capable of requesting the resulting tag (similar to a request for a user attribute tag that is not obtained from structured data) for use as a constraint on the user's session and/or as a preference for ranking returned results. In this manner, as an illustrative example, the results displayed to the user may include only content about products that can be shipped within the amount of time the user is willing to wait. Thus, in one example, it is the tag, and not the structured data user attribute itself, that is tested or used by dialog engine 500 in the dialog and retrieval processes.

Integration of structured data into content provider system 100 (e.g., to be associated with a user 105, a document or other knowledge container 201, or an instance of dialog during a user-provider session) may be accomplished in a number of different ways. In one example, structured data is uploaded into content provider system 100 in bulk before any user-provider session is initiated. In an alternative example, structured data is obtained dynamically upon initiation of a user-provider interaction session, or at a particular point therein, and then auto-mapped into one or more portions of ordered taxonomies. During the user-provider interaction session, one or more triggers may constrain the user's search, such as by testing one or more sets of ordered concepts using "at" (equals), "left" (less than), "right" (greater than), or between operators (operating numerically, if the concepts are ordered according to integer, float, or date structured data attributes, or alphabetically, if the concepts are ordered according to a string structured data attribute). In a further example, the user's session is constrained using Boolean combinations of such operators one the same or different sets of ordered concepts, alone or in combination with one or more textual requirements (e.g., on the taxonomies or, alternatively, using a full-text search on the knowledge containers 201). In yet another example, the user's session is constrained by requiring that returned knowledge containers 201 include a particular value, or range of values, of a particular structured data attribute. As an illustrative example, a returned knowledge container 201 requires that a particular string-type structured data attribute include a string containing a particular substring. In another example, a returned knowledge container 201 is required to include a particular date-type structured data attribute (e.g., CreatedDate, LastModifiedDate, PublishedDate) having a value that matches a particular date value, or range of date values.

In one example, instead of resulting in a hard constraint on the user's search, one or more triggers creates one or more "goals" on the ordered taxonomies or on the structured data. Once created during a user's session, these goals cause the content provider system 100 to obtain the indicated structured data item or ordered taxonomy concept node, either from the user's stored profile information, or by asking the user for the value by presenting the user with a dialog question. Such goals may be specified during the dialog by user input of one or more structured data values and specified "less than," "greater than," or "between"

(inclusive or exclusive) constraints. For example, the dialog presents a prompt that requests a user response. The user response includes a structured data value entered into a user-input box. The user response may also include one or more constraint operators (e.g., "greater than," "less than," "equals," "between," and the like). In one example, the user 105 selects one or more constraint operators using pull down menus presented to the user 105. A structured data goal looks in the user object or other session context for a value that resolves the goal (in one example, if no such value if found, a clarifying or discriminating follow-up dialog prompt is presented to the user to obtain a modified goal).

In one example, content provider 100 includes an application interface 515 capable of passing structured data values to a DLL or other external application 520, which may, but need not, terminate the user-provider dialog session. In a further example, application interface 515 of content provider 100 is capable of receiving one or more structured data values back to the user-provider dialog session from the DLL or other external application, and auto-mapping one or more of such imported structured data values to one or more sets of ordered concepts.

In one example, structured data is additionally or alternatively used, alone or in combination with one or more other criteria, as a "preference" for sorting and ordering (or re-ordering) retrieved content for presenting such results to the user 105. In one example, user interface 130 presents a generic or session-specific dialog box to the user 105 for specifying various possible sorting options, e.g., sorting by relevance determined from the autocontextualization/auto-mapping tags (overall, or using only tags associated with a user-specified taxonomy), sorting alphabetically by a company-name tag, or sorting (e.g., ascending or descending) using the value a structured data attribute (e.g., "P/E ratio"). In one example, such a ranking preference depends upon, among other things, a "distance" between a first concept 205 to which the particular returned knowledge container 201 is tagged and another concept 205 that is confirmed as being relevant to the user's search. For unordered taxonomies, a hierarchical distance metric may be used. For a set of ordered concepts, in an ordered or partially-ordered taxonomy 210, a nonhierarchical number-line type distance or the like may instead be used in such a preference determination.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects.

What is claimed is:

1. A computerized content provider system including:
   a multidimensional knowledge map embodied in a machine-readable medium, the knowledge map including concepts organized into taxonomies, each taxonomy including a hierarchical structure, and at least one taxonomy including a first concept that is ordered with respect to a second concept independent of the hierarchical structure; and
   content items, at least one of the items tagged to at least one of the concepts using a value of a structured data attribute associated with the at least one of the items, the structured data attribute having a range of possible ordered or orderable values that are used during operation of the computerized content provider system.

2. The system of claim 1, in which the tagged item is selected from the group consisting of a user query, a user attribute, and a resource.

3. The system of claim 1, in which the item is tagged to at least one of the concepts using at least one keyword included in the item.

4. The system of claim 1, in which the first concept includes a first mapping function, the first mapping function including an input and an output, the input of the first mapping function including a value of a structured data attribute of at least one item, and the output of the first mapping function indicating whether to tag the item to the first concept.

5. The system of claim 4, in which the second concept includes a second mapping function, the second mapping function including an input and an output, the input of the second mapping function including a value of a structured data attribute of at least one item, and the output of the mapping function indicating whether to tag the at least one item to the second concept, such that the at least one item tagged to the first concept is ordered with respect to the at least one item tagged to the second concept.

6. The system of claim 4, in which the input of the first mapping function includes information obtained from a source external to the system that is used in providing the output of the first mapping function.

7. The system of claim 4, in which the input of the first mapping function uses information about how the at least one item tags to other concepts in providing the output of the first mapping function.

8. The system of claim 4, in which the input of the first mapping function uses information about at least one keyword included in the at least one item in providing the output of the first mapping function.

9. A computerized content provider system including:
   a multidimensional knowledge map embodied in a machine-readable medium, the knowledge map including concepts organized into taxonomies, each taxonomy including a hierarchical structure, and at least one taxonomy including a first concept that is ordered with respect to a second concept independent of the hierarchical structure; and
   a first constraint to items associated with only one of the first and second concepts, in which the first constraint is based on at least one value of a structured data parameter, to be specified by or associated with a particular user, that maps to at least one value of the structured data parameter associated with the only one of the first and second concepts the structured data parameter having a range of possible ordered or orderable values that are used during operation of the computerized content provider system.

10. The system of claim 9, in which the first constraint is based on at least one structured data ordered operator to be specified by or associated with a particular user.

11. The system of claim 10, in which the structured data ordered operator is selected from the group consisting of: "less than," "left of," "greater than," "right of," and "between."

12. The system of claim 9, further including a second constraint to at least one portion of the knowledge map based on language to be specified by or associated with the particular user.

13. The system of claim 12, in which the second constraint is based on at least one hierarchical ordered operator.

14. The system of claim 13, in which the hierarchical ordered operator is selected from the group consisting of: "under," "is part of," "at," and "above."

15. A machine-assisted method of providing content to a user, the method including:
    organizing concepts into groups representing dimensions of a domain, including ordering a first concept with respect to a second concept in the same group, the ordering using at least one structured data parameter, the at least one structured data parameter having a range of possible ordered or orderable values; and
    tagging at least one item to at least one of the first and second concepts; and
    constraining a user's machine-assisted search to only one of the first and second concepts.

16. The method of claim 15, in which the constraining is based at least in part on at least one value of the structured data parameter, to be specified by or associated with a particular user, that maps to at least one value of the structured data parameter associated with the only one of the first and second concepts.

17. The method of claim 15, in which the constraining is based at least in part on at least one structured data ordered operator to be specified by or associated with a particular user.

18. The method of claim 15, in which the constraining is based on language to be specified by or associated with the particular user.

19. The method of claim 15, in which the constraining is based on at least one hierarchical ordered operator.

20. The method of claim 15, in which the tagging at least one item includes tagging at least one item selected from the group consisting of a user query, a user attribute, and a resource.

21. A computerized content provider system including:
    a multidimensional knowledge map embodied in a machine-readable medium, the knowledge map including concepts organized into taxonomies, each taxonomy including a hierarchical structure, and at least one taxonomy including a first concept that is ordered with respect to a second concept independent of the hierarchical structure using a structured data parameter, the structured data parameter having a range of possible ordered or orderable values that are used during operation of the computerized content provider system; and
    a user interface configured to present a question to a user to elicit from the user information about at least one value of a structured data parameter that maps to the structured data parameter used to order the first and second concepts.

22. The system of claim 21, in which the user interface is configured to present multiple questions to the user to elicit from the user information about multiple values of corresponding multiple structured data parameters that map to multiple structured data parameters used to order concepts along different dimensions of the knowledge map.

23. The system of claim 22, further including constraints to portions of multiple taxonomies based on the information about multiple values of the corresponding multiple structured data parameters.

24. A machine-assisted method of providing content to a user, the method including:
    organizing concepts into groups representing dimensions of a domain, including ordering a first concept with respect to a second concept in the same group, using at least one structured data parameters the structured data parameter having a range of possible ordered or orderable values; and
    presenting a question to a user via a machine user interface to elicit from the user information about at least one value of a structured data parameter that maps to the structured data parameter used to order the first and second concepts.

25. The method of claim 24, further including presenting multiple questions to the user to elicit from the user information about multiple values of corresponding multiple structured data parameters that map to multiple structured data parameters used to order concepts along different dimensions of the knowledge map.

26. The method of claim 25, further including constraining a user's search to portions of multiple taxonomies based on the information about multiple values of the corresponding multiple structured data parameters.

27. The method of claim 24, further including:
    tagging at least one item to at least one of the first and second concepts; and
    constraining a user's search to only one of the first and second concepts.

28. A machine-assisted method of providing content to a user, the method including:
    organizing concepts into hierarchical groups representing dimensions of a domain, including ordering a first concept with respect to a second concept in the same group independent of the hierarchy using at least one structured data parameter, the structured data parameter having a range of possible ordered or orderable values; and
    presenting at least one question to a user via a machine user interface to elicit from the user information about a range of ordered concepts that is relevant to the user's needs.

29. The method of claim 28, further including presenting multiple questions to the user to elicit from the user information about multiple ranges of ordered concepts that are relevant to the user's needs.

30. The method of claim 28, further including:
    receiving from the user information about the range of ordered concepts that is relevant to the user's needs; and
    constraining the user's search to the indicated range of ordered concepts received from the user.

31. The method of claim 28, in which the range of ordered concepts includes a single ordered concept.

32. The method of claim 28, in which the range of ordered concepts includes all concepts that are ordered as being to the left of a particular ordered concept.

33. The method of claim 28, in which the range of ordered concepts includes all concepts that are ordered as being to the right of a particular ordered concept.

34. The method of claim 28, in which the range of ordered concepts includes all concepts that are ordered as being between two specified ordered concepts.

35. A computerized content provider system including:
    a multidimensional knowledge map embodied in a machine-readable medium, including concepts organized along dimensions of the knowledge map into taxonomies, the concepts including items tagged thereto, the knowledge map including a first concept that is ordered with respect to a second concept, within the same first taxonomy, using at least one structured data parameter, the structured data parameter having a range of possible ordered or orderable values that are used during operation of the computerized content provider system; and a dialog engine that maps a user to only one of the first and second concepts based on a value of a structured data user attribute associated with the user.

36. The system of claim 35, further including a user interface, coupled to the dialog engine, in which the user interface is configured to conditionally formulate a question to be presented to the user based on which one of the first and second concepts to which the user is mapped.

37. A machine-assisted method of providing content to a user, the method including:

organizing concepts into groups representing dimensions of a domain, including ordering a first concept with respect to a second concept in the same group, using at least one structured data parameter, the structured data parameter having a range of possible ordered or orderable values; and mapping a user to only one of the first and second concepts based on a value of a structured data user attribute associated with the user.

38. The method of claim 37, further including conditionally formulating a question to be presented to the user based on which one of the first and second concepts to which the user is mapped.

39. A computerized content provider system including:

a multidimensional knowledge map embodied in a machine-readable medium, including concepts organized along dimensions of the knowledge map into taxonomies, the concepts including items tagged thereto, the knowledge map including a first concept that is ordered with respect to a second concept, within the same first taxonomy, using at least one structured data parameter, the structured data attribute having a range of possible ordered or orderable values that are used during operation of the computerized content provider system; and a dialog engine configured to provide an interactive dialog between the system and a user for constraining the user's search for needed content to at least one portion of the knowledge map, in which the dialog engine includes a user interface that is configured to conditionally formulate a question to be presented to the user based on a structured data user attribute associated with the user.

40. A machine-assisted method of providing content to a user, the method including:

organizing concepts into groups representing dimensions of a domain, including ordering a first concept with respect to a second concept in the same group, using at least one structured data parameters the structured data parameter having a range of possible ordered or orderable values; and providing an interactive dialog between the system and a user for constraining the user's machine-assisted search for needed content to at least one portion of the knowledge map, in which the dialog engine includes a user interface that is configured to conditionally formulate a question to be presented to the user based on a structured data user attribute associated with the user.

41. A computerized content provider system including:

a multidimensional knowledge map embodied in a computer-assisted medium, including concepts organized along dimensions of the knowledge map into taxonomies, the concepts including items tagged thereto, the knowledge map including a first concept that is ordered with respect to a second concept, within the same first taxonomy, using at least one structured data parameter, the structured data parameter having a range of possible ordered or orderable values that are used during operation of the computerized content provider system;

a dialog engine configured to provide an interactive dialog between the system and a user to constrain the user's search for needed content to at least one portion of the knowledge map based at least in part on information obtained from the user about at least one structured data parameter; and an application interface, coupled to at least one of the dialog engine and the knowledge map, the interface configured to pass at least one structured data parameter to an external application.

42. The system of claim 41, further including a user interface including a user-selectable link that calls the external application.

43. The system of claim 42, in which the link is configured to be conditionally presented to the user based at least in part on at least one of:

an aspect of the interactive dialog;
a structured data parameter;
a user attribute;
language in a query from the user; and
language from a user-response to a dialog question.

44. A machine-assisted method of providing content to a user, the method including:

organizing concepts into groups representing dimensions of a domain, including ordering a first concept with respect to a second concept in the same group, using at least one structured data parameters the structured data parameter having a range of possible ordered or orderable values;

engaging in an interactive dialog between a system and a user to constrain the user's search for needed content based at least in part on information obtained from the user about at least one structured data parameter; and passing at least one structured data parameter to an external application.

45. The method of claim 44, further including presenting a user-selectable link for calling the external application.

46. The method of claim 45, further including conditionally presenting the user-selectable link based at least in part on at least one of:

an aspect of the interactive dialog;
a structured data parameter;
a user attribute;
language in a query from the user; and
language from a user-response to a dialog question.

47. A computerized content provider system including:

a multidimensional knowledge map embodied in a computer-readable medium, including concepts organized along dimensions of the knowledge map into taxonomies, and including a first concept that is ordered with respect to a second concept, within the same first taxonomy, using at least one structured data parameter, the structured data parameter having a range of possible ordered or orderable values that are used during operation of the computerized content provider system; and at least one item including a first tag that tags the at least one item to at least one of the first and second concepts based at least in part on a first structured data parameter that is modified based on an indication derived from at least one previous user's interaction with the system.

48. The system of claim 47, in which the first tag also tags the at least one item to at least one of the first and second concepts based on at least one of:
   a second structured data parameter;
   language associated with the at least one item; and
   a second tag associated with the at least one item.

49. The system of claim 47, in which the indication is based on whether the at least one previous user's interaction with the system was deemed successful.

50. The system of claim 47, in which the indication is based on context information obtained from a dialog interaction with the at least one previous user.

51. A machine-assisted method of providing content to a user, the method including:
   organizing concepts into groups representing dimensions of a domain, including ordering a first concept with respect to a second concept in the same group, using at least one structured data parameters the structured data parameter having a range of possible ordered or orderable values; and
   tagging at least one item to at least one of the first and second concepts based at least in part on a first structured data parameter that is modified based on an indication derived from at least one previous user's interaction with a system.

52. The method of claim 51, in which the tagging is also based on at least one of:
   a second structured data parameter;
   language associated with the at least one item; and
   a second tag associated with the at least one item.

53. The method of claim 51, in which the tagging is also based on at least one of whether the at least one previous user's interaction with the system was deemed successful; and
   context information obtained from a dialog interaction with the at least one previous user.

* * * * *

UNITED STATES PATENT AND TRADEMARK OFFICE
CERTIFICATE OF CORRECTION

PATENT NO. : 6,980,984 B1
DATED : December 27, 2005
INVENTOR(S) : Huffman et al.

It is certified that error appears in the above-identified patent and that said Letters Patent is hereby corrected as shown below:

Drawings,
Sheet 3, Fig. 3 (Box 310), line 2, delete "<persom>" and insert -- <person> --.

Column 8,
Line 63, delete "20030115791" and insert -- 20030115191 --.

Column 13,
Line 8, delete "documents" and insert -- document's --.
Line 24, after "In" delete "sum,".
Line 29, after "PUB." insert -- No. --.

Column 22,
Line 57, after "concepts" insert -- , --.

Column 24,
Line 6, delete "parameters" and insert -- parameter, --.

Column 25,
Line 58, delete "parameters" and insert -- parameter, --.

Column 26,
Line 38, delete "parameters" and insert -- parameter, --.

Column 28,
Line 1, delete "parameters" and insert -- parameter, --.

Signed and Sealed this

Sixth Day of June, 2006

JON W. DUDAS
*Director of the United States Patent and Trademark Office*